United States Patent

[11] 3,570,437

[72] Inventor Paul D. Davis, Jr.
Garland, Tex.
[21] Appl. No. 798,355
[22] Filed Feb. 11, 1969
[45] Patented Mar. 16, 1971
[73] Assignee Texas Instruments Incorporated
Dallas, Tex.

[54] MULTI-CYCLE OCEAN DATA GATHERING SYSTEM
2 Claims, 5 Drawing Figs.

[52] U.S. Cl. .................................................... 114/16, 9/8
[51] Int. Cl. ...................................................... B63g 9/00,
B63b 21/52
[50] Field of Search ............................................ 114/16,
16.3, 16.4; 9/8

[56] References Cited
UNITED STATES PATENTS
| | | | |
|---|---|---|---|
| 1,207,851 | 12/1916 | Buerke.......................... | 114/16.4 |
| 3,368,510 | 2/1968 | Humphrey..................... | 114/16 |

Primary Examiner—Trygve M. Blix
Attorneys—James O. Dixon, Andrew M. Hassell, Harold Levine, Melvin Sharp and Rene E. Grossman ABSTRACT: A system for repetitively submerging and surfacing an ocean data gathering instrument package. The system includes a number of vessels each large enough to contain sufficient water to sink the instrument package and the remaining vessels. The package is submerged by flooding one of the vessels and is surfaced by detaching the flooded vessel from the package and the remaining vessels. The package may be submerged as many times as there are vessels in the system.

Patented March 16, 1971

INVENTOR
PAUL D. DAVIS, JR.

INVENTOR:
PAUL D. DAVIS, JR.

MULTI-CYCLE OCEAN DATA GATHERING SYSTEM

Scientific data relating to the bottom of the ocean is usually gathered by lowering an instrument package to the ocean floor, recording the desired data, returning the package to the surface and removing the data from the package. Often the instrument package is dropped into the ocean from an aircraft or a ship and is sunk by a heavy weight attached to the package. After the instruments in the package have performed their function the weight is detached from the package and the package floats to the surface where it either is recovered by a ship or is interrogated by radio. Heretofore gathering data in this manner has been relatively expensive because it has been necessary to return the instrument package to attach a new weight at the start of each data gathering cycle.

In accordance with the present invention, a system for sinking and subsequently floating a vehicle in a body of liquid includes a portion of the vehicle that is filled with the liquid to sink the vehicle and that is detached from the vehicle to flat the vehicle. In the preferred embodiment, the vehicle includes an instrument package and a plurality of vessels attached to the package that are sequentially flooded and detached from package thereby repetitively sinking and floating the package.

A more complete understanding of the invention may be had be referring to the following detailed description when taken in conjunction with the drawings, wherein.

Figure 1:
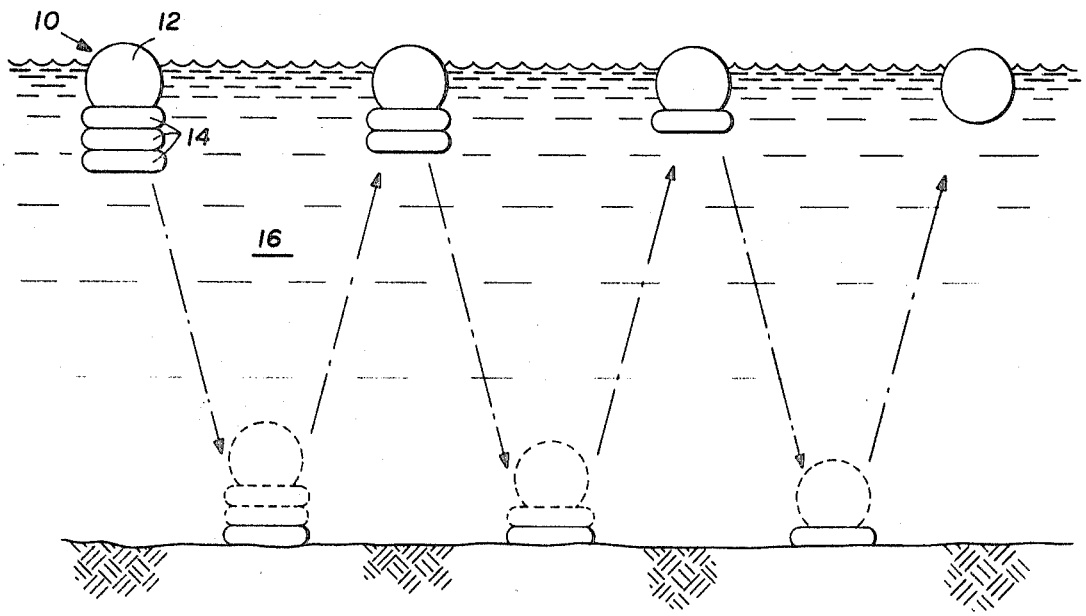
FIG. 1 is a schematic illustration of the operation of a multicycle ocean data gathering system employing the invention.

Referring now to the drawings, wherein like reference numerals designate like parts throughout the several views, and referring particularly to FIG. 1 thereof, there is shown a multicycle ocean data gathering system employing the invention. The system comprises a data gathering vehicle 10 that includes an instrument package 12 and three vessels 14 positioned in a stack under the package 12. The instrument package 12 is filled with data retrieving instruments such as data sensors and recorders, radio receivers and transmitters, and the like. The instrument package 12 is so constructed that it is positively buoyant in sea water, that is, so that it tends to float.

The vessels 14 are hollow and are initially filled with air. When filled with air, the vessels 14 have a neutral buoyancy in water, that is, they neither tend to float nor to sink. The vessels 14 are individually flooded with water on command from the instrument package 12. When flooded with water, the vessels 14 each have a negative buoyance in water greater than the positive buoyancy of the instrument package 12. That is, each vessel 14 when flooded with water has sufficient tendency to sink to overcome the tendency of the instrument package 12 to float.

The vehicle 10 is initially dropped into the ocean 16 from a ship or an aircraft. Whenever it is desired to start a data gathering cycle, the bottommost vessel 14 is flooded with water. Since the vessels 14 when flooded have a greater tendency to sink than the package 12 has to float, this causes the vehicle 10 to sink to the bottom of the ocean 16. Instruments in the instrument package 12 of the vehicle 10 gather and record data either while the vehicle 10 sinks or while the vehicle 10 is on the bottom or both.

When the instruments in the package 12 have completed their function the instrument package 12 and the unflooded vessels 14 of the vehicle 10 are detached from the flooded vessel 14. Since the instrument package 12 tends to float in the ocean 16 and since the unflooded vessels 14 neither tend to float nor sink, this permits the vehicle 10 to move upwardly through the ocean 16 away from the flooded vessel 14 which remains on the bottom.

When the vehicle 10 reaches the surface, the data gathered and recorded by the instruments in the package 12 is transmitted to a remote point, either automatically or upon command. The vehicle 10 is then ready to begin another data gathering cycle. The vehicle 10 may be operated through as many data gathering cycles as there are vessels 14 in the vehicle 10; in the embodiment shown in FIG. 1, three cycles.

Figure 2:
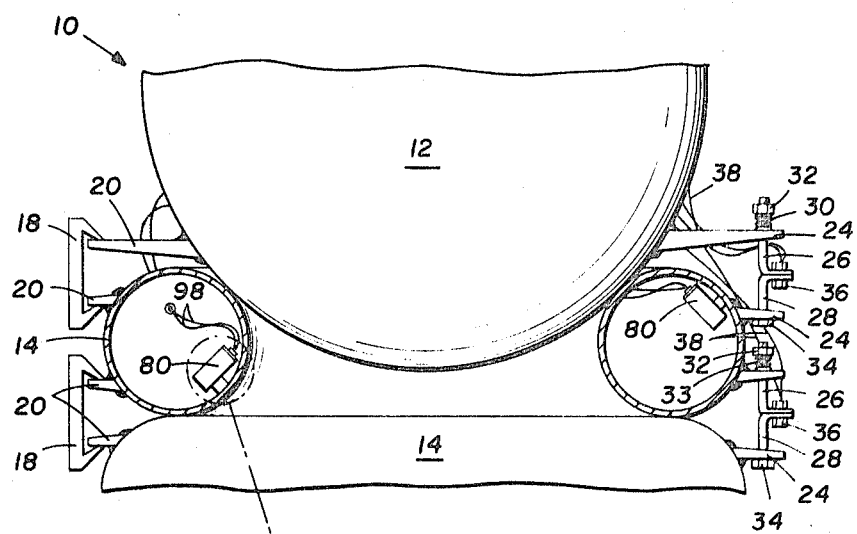
FIG. 2 is an illustration of a portion of the preferred embodiment of the invention in which certain parts have been broken away and in which certain other parts have been enlarged more clearly to illustrate certain features of the invention.

Referring now to FIG. 2, the details of the data gathering vehicle 10 are shown. The instrument package 12 may be of any desired shape and construction, however, the instrument package 12 is preferably constructed similarly to the ocean bottom seismograph manufactured by Texas Instruments Incorporated. That device is spherical in shape, has an outside diameter of 40 inches, a weight of 1,450 pounds and a positive buoyancy in sea water of 100 pounds. The outer shell of the device is constructed from aluminum and has a wall thickness of 1 inch. For stability and to assure proper operation of a radio antenna and a light beacon (not shown) which project from the top of the device, the ocean bottom seismograph is purposely constructed to be "bottom heavy" and to float with only a small portion projecting above the surface of the ocean.

The vessels 14 may also be of any desired shape, however, the vessels 14 are preferably annular in shape since vessels of that shape are more easily attached to and released from the instrument package 12. Also, annularly shaped vessels provide stability for the vehicle 10 when the vehicle 10 rests on the bottom of the ocean. By way of example, an annularly shaped vessel having a major outside diameter of 46 inches and a minor outside diameter of 10 inches that is constructed from 1 inch thick aluminum has an approximately neutral buoyancy in sea water when filled with air and has a negative buoyancy in sea water of approximately 300 pounds when filled with sea water.

The vessels 14 may be attached to the instrument package 12 and to each other in any desired manner but are conveniently attached by the cooperation of C-shaped clamps 18 connected between arms 20 extending from one side of the instrument package 12 and the vessels 14 and compressive couplers 22 connected between arms 24 extending from the other side of the instrument package 12 and the vessels 14. The clamps 18 are simply rigid members positioned in frictional engagement with upper and lower surfaces of appropriate ones of the arms 20. For example, the instrument package 12 is connected to the uppermost vessel 14 by a C-shaped clamp 18 positioned in engagement with the upper surface of the arm 20 extending from instrument package 12 and with the lower surface of the upper arm 20 of the uppermost vessel 14.

The compressive couplers 22 are each comprised of an upper L-shaped bracket 26 extending downwardly through an appropriate upper arm 24, for example, the arm 24 of the package 12, and a lower L-shaped bracket 28 extending upwardly through an appropriate lower arm 24, for example, the upper arm 24 of the uppermost vessel 14. A spring 30 and a nut 32 prevent the bracket 26 from moving through the upper arm 24 and a nut 34 prevents the bracket 38 from moving through the lower arm 24. The brackets 26 and 28 are interconnected by an explosive bolt 36 having a pair of leads 38 extending into the instrument package 12.

The data retrieving vehicle 10 is assembled by attaching C-shaped clamps 18 and compressive couplers 22 to appropriate ones of the arms 20 and 24 and then tightening the nuts 32 of the couplers 22 sufficiently to place the clamps 18 in tension. Any vessel 14 may be separated from the vehicle 10 by a signal from the package 12 through the leads 38 of the bolt 36 of the coupler 22 connected between the vessel 14 and the vehicle 10. This signal explodes the bolt 36 thereby separating the brackets 26 and 28 of the coupler 22. When the brackets 26 and 28 are separated, the vehicle 10 begins to float upwardly away from the vessel 14 whereupon the bracket 18 connected between the vehicle 10 and the vessel 14 falls out of engagement with the arms 20.

Figure 4:
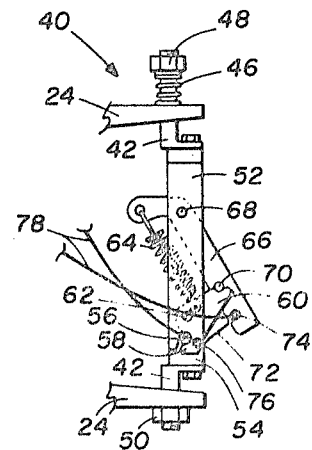
FIG. 4 is an end view of a release assembly which may be used in the device shown in FIG. 2.

Referring now to FIG. 4, a spring actuated compressive coupler 40 which may be used in place of compressive coupler 22 shown in FIG. 2 is illustrated. Like the coupler 22, the coupler 40 is positioned between appropriate ones of the arms 24. The coupler 40 includes upper and lower L-shaped brackets 42 and 44 which extend through an upper arm 24 and a lower arm 24, respectively. The upper bracket 42 is prevented from moving through the upper arm 24 by a spring 46 and a nut 48 and the lower bracket 42 is prevented from moving through the lower arm 24 by a nut 50.

An upper body portion 52 is secured to the upper bracket 42 and a lower body portion 54 is secured to the lower bracket 44. The lower body portion 54 is secured to the upper body portion 52 by interengagement of a pin 56 extending from the lower body portion 54 and a latch 58 extending from a dog 60 that is pivotally supported on the upper body portion 52 by a pivot 62. The dog 60 is biased to move the latch 58 in an unlatching direction by a spring 64 connected between the dog 60 and an arm 66 that is pivotally supported on the upper body portion 52 by a pivot 68. The dog 60 is normally prevented from pivoting about the pivot 62 under the action of the spring 64 by a pin 70 on the arm 66.

The spring 64 also urges the arm 66 to pivot counterclockwise about the pivot 68 and to thereby move the pin 70 out of the path of the dog 60. The arm 66 is normally prevented from pivoting under the action of spring 64 by a length of fusible wire 72 extending between a terminal 74 on the arm 66 and a terminal 76 on the upper body portion 52. A pair of leads 78 extend from the terminals 74 and 76 to the instrument package 12 of the vehicle 10.

Like the compressive coupler 22 shown in FIG. 2, the spring actuated coupler 40 is actuated by a pulse from the instrument package 12. When such a pulse is applied to the leads 78, the length of fusible wire 72 is melted. This frees the arm 66 for pivotal movement about the pivot 68 under the action of the spring 64, which in turn moves the pin 70 out of the path of the dog 60. As soon as the pin 70 has cleared the dog 60, the dog 60 is pivoted about the pivot 62 by the spring 64. This moves the latch 58 on the dog 60 out of the path of the pin 56. Since the dog 60 is connected to the upper arm 24 and the pin 56 is connected to the lower arm 24, this frees the portion of the vehicle 10 connected to the upper arm 24 for movement away from the vessel 14 connected to the lower arm 24 by flotation.

Referring again to FIG. 2, the vessels 14 are flooded by actuating a pair of explosive actuated valves 80 positioned to allow water to enter the vessel 14 and to allow air to escape from the vessel 14. As is shown in the enlarged portion of FIG. 2, the explosive actuated valves 80 are each comprised of a body 82 and an inlet fitting 84 extending from the body 82 through the wall of the vessel 14. The body 82 has an outlet hole 86 formed through it and the inlet fitting 84 has an inlet hole 88 formed through it in alignment with the outlet hole 86. The inlet hole 88 is normally closed by a cap 90 formed integrally with the inlet fitting 84 and extending over the end of the inlet hole 88.

A valve opening cutter 92 having a hole 94 formed through it is slidably supported in the body 82 in engagement with the cap 90 of the inlet hole 88. A cartridge 96 is positioned in the body 82 for driving the cutter 92 towards the inlet fitting 84. A pair of leads 98 extend from the cartridge 96 to the instrument package 12.

Whenever it is desired to flood one of the vessels 14, a pulse is applied to the leads 98 of both of the explosive actuated valves 80 of the vessel 14 to be flooded. This explodes the cartridges 96 of the valves 80 thereby driving the cutters 92 toward the inlet fittings 84. This action shears the caps 90 from the inlet fittings and moves the holes 94 in each of the cutters 92 into alignment with the inlet holes 88 and the outlet holes 86 of the valves 80. This permits water to flow into and air to flow out of the vessel 14 to be flooded.

Figure 3:
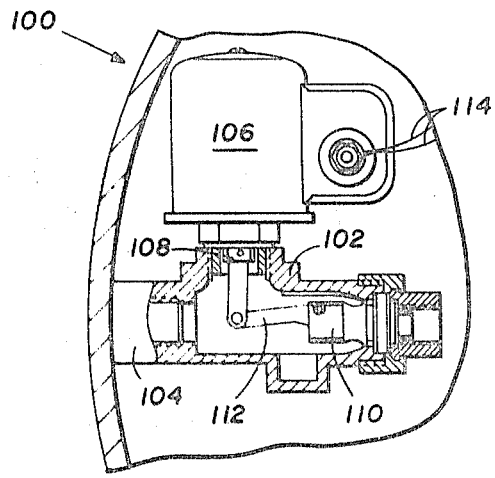
FIG. 3 is a partial sectional view of a valve assembly which may be used in the device shown in FIG. 2.

Referring now to FIG. 3, a solenoid actuated valve 100 which may be substituted for the explosive actuated valve 80 shown in FIG. 2 is illustrated. The solenoid actuated valve 100 is comprised of a body 102 and the inlet fitting 104 extending from the body 102 through the wall of the vessel 14. A solenoid 106 having a plunger 108 is supported on the body 102 and a normally closed valve 110 is positioned in the body 102 to prevent water from flowing in and/or air from flowing out the inlet fitting 104 of the valve 100. The valve 110 is connected to the plunger 108 of the solenoid 106 by a linkage 112. A pair of leads 114 extend from the solenoid 106 to the instrument package 12.

Whenever it is desired to operate the valve 100 a current is applied through the leads 114 from the instrument package 12 to the solenoid 106. This energizes the solenoid 106 whereupon the plunger 108 of the solenoid moves upwardly. The plunger 108 operates the linkage 112 which in turn opens the normally closed valve 110 to allow water to flow through the inlet fitting 104 into the vessel 14 and/or to allow air to flow out the inlet fitting 104 from the vessel 14.

Figure 5:
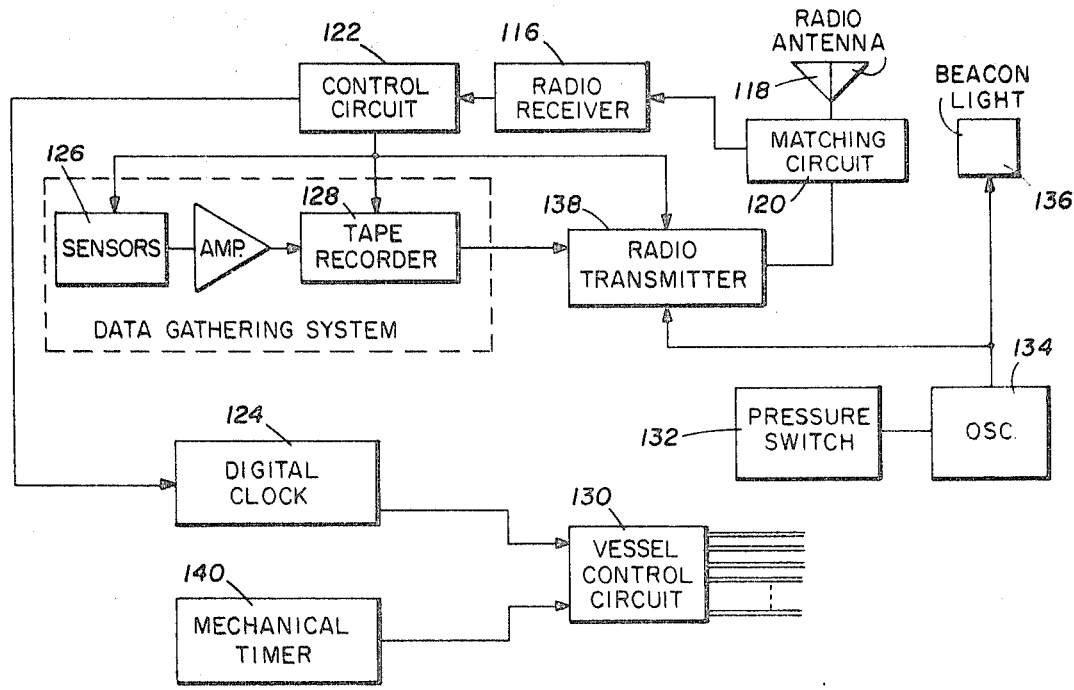
FIG. 5 is a schematic illustration of typical circuitry which may be employed in the device shown in FIG. 2.

Referring now to FIG. 5, a circuit for controlling the operation of the data retrieving vehicle 10 is schematically illustrated. Each data gathering cycle of the vehicle 10 is initiated by a radio signal which is fed to a radio receiver 116 through a radio antenna 118 and a matching circuit 120. Upon receipt of a cycle-starting signal, the radio receiver 116 activates a control circuit 122 which in turn initiates operation of a digital clock 124, a plurality of data gathering sensors 126 and a data recording tape recorder 128.

After a preset period of time, the digital clock 124 pulses a vessel control circuit 130. The vessel control circuit 130 has a plurality of pairs of output leads that extend to the operating leads of the valves and the compressive couplers of the vehicle 10. The circuit 130 operates to sequentially apply a pulse to a different pair of its output leads each time it receives a pulse from the digital clock 122. The vessel control circuit 124 may be comprised of a stepping switch, a shift register, or any other device that is advanced through a plurality of stages in response to input pulses.

The first pair of output leads of the vessel control circuit 130 extend to the operating leads of the valves of the bottommost vessel 14 of the vehicle 10. Accordingly, when the first pulse as applied to the vessel control circuit 130 by the digital clock 124, the vessel control circuit 130 opens the valves of the bottommost vessel 14. As soon as sufficient water flows into the bottommost vessel 14 to overcome the buoyancy of the package 12 the vehicle 10 begins to sink in the ocean 16 in the manner illustrated in FIG. 1. Since operation of the sensors 126 and the recorder 128 was initiated by the control circuit 122 upon receipt of a cycle-starting pulse by the radio receiver 116, data is gathered and recorded as the vehicle 10 sinks to the bottom and while it is on bottom of the ocean 16.

When the digital clock 124 has measured the passage of a predetermined amount of time, a second pulse is applied to the vessel control circuit 130. The second pair of output leads of the vessel control circuit 130 extend to the operating leads of the compressive coupler positioned between the bottommost vessel 14 and the middle vessel 14. Therefore, when the digital clock 124 applies a second pulse to the vessel control circuit 130 the coupling between the bottommost vessel 14 and the vehicle 10 is broken. This permits the vehicle 10 to rise through the ocean 16 away from the flooded vessel 14 which remains on the bottom.

As the vehicle 10 rises through the water, the decreasing pressure of the ocean 16 is sensed by a pressure switch 132. When the vehicle 10 reaches the surface the pressure switch 132 initiates operation of an oscillator 134. The oscillator 134 causes a beacon light 136 to emit timed flashes of light and also causes a radio transmitter 138 to emit timed radio signals through the matching circuit 120 and the antenna 118.

When the timed flashes of light and/or the timed radio signals are detected by a remote data receiving station (not shown), the remote station transmits a radio signal to the vehicle 10. The radio signal is fed through the antenna 118 and the matching circuit 120 to the radio receiver 116. Upon receipt of the signal, the radio receiver 116 actuates the control circuit 122 which in turn switches both the tape recorder 128 and the radio transmitter 138 into data transmitting modes. The recorder 128 then feeds previously recorded data to the transmitter 138 which in turn transmits the data through the matching circuit 120 and the antenna 118 to the remote data receiving station.

In addition to the digital clock 124, a mechanical timer 138 is connected to the vessel control circuit 130. The mechanical timer 138 prevents loss of the instrument package 12 upon a failure of the circuitry schematically illustrated in FIG. 5. After a period of time considerably longer than the total length of all of the data gathering cycles of the vehicle 10 has elapsed, the mechanical timer 138 applies a pulse to the last pair of output leads of the vessel control circuit 130. The last pair of output leads of the control circuit 130 extend to the operating leads of the compressive coupler positioned between the instrument package 12 and the uppermost vessel 14. Accordingly, the mechanical timer 138 assures that, even if there is an electrical failure within the vehicle 10, the instrument package 12 will be separated from the vessels 14 so that it can float to the surface to be recovered.

Loss of the instrument package 12 can also be prevented when the compressive coupler 40 shown in FIG. 4 is used to couple the instrument package 12 to the uppermost vessel 14 by forming the fusible wire 72 of the compressive coupler 40 from a material that corrodes in sea water in a period of time longer than the total length of all of the data gathering cycles of the vehicle 10. The use of such a wire 72 prevents loss of the instrument package 12 because, in the event the circuitry shown in FIG. 5 fails to apply an electrical signal to the length of fusible wire 72, the corrosive effect of the ocean 16 on the length of fusible wire 72 eventually corrodes the wire 72 to such an extent that it cannot withstand the force of the spring 64. Then, the spring 64 breaks the wire 72 and uncouples the compressive coupler 40, whereupon the instrument package 12 is free to float to the surface.

It should be understood that the circuit shown in FIG. 5 is illustrative only and that many different types of control circuitry can be used to operate the vehicle 10. For example, the digital clock 124 can be dispensed with entirely and the sinking and floating of the vehicle 10 placed solely under the control of radio and sonar receiving units, respectively. Alternatively, the radio receiver 116 and the radio transmitter 136 can be dispensed with entirely and the operation of the vehicle 10 placed solely under control of a preset digital clock. Finally, the operation of the vehicle 10 can, if desired, be placed solely under control of the pressure switch 132 so that a flooded vessel 14 is detached as soon as the vehicle 10 sinks to a predetermined depth and another vessel 14 is flooded as soon as the vehicle 10 rises to a predetermined depth in the ocean 16.

It should also be understood that the operation of the sensors 126 and the recorder 128 can be entirely separate from the sinking and floating circuitry of the vehicle 10, if desired. For example, the operation of the sensors 126 can be placed under control of the pressure switch 132 so that operation of the sensors 126 is started when the vehicle 10 sinks to a predetermined depth and is stopped when the vehicle 10 rises to a predetermined depth in the ocean 16. Finally, the pressure switch 132 can be replaced by a photosensitive device, such as a photocell, etc., if desired. Such a substitution causes the functions performed by the pressure switch 132 to be performed in response to the detection of an increased amount of light rather than in response to a decreased amount of pressure.

Although specific embodiments of the invention are shown in the drawings and described in the foregoing specification, it will be understood that the invention is not limited to the embodiments shown but is capable of rearrangement, modification and substitution of parts and elements without departing from the spirit of the invention.

I claim:

1. A multicycle underwater data gathering system comprising a vehicle including a spherically shaped data retrieving portion having a positive buoyancy in water, a plurality of angularly shaped vessels attached to and positioned in a stack beneath said data retrieving portion, said vessels initially having neutral buoyancy in water and each said vessels having a negative buoyancy when filled with water greater than the positive buoyancy of said data retrieving portion, means for sequentially filling said vessels with sufficient water to sink the vehicle and means for detaching the filled vessels from the vehicle so that the vehicle repetitively sinks and rises in water.

2. The system according to claim 1 wherein adjacent vehicle components in the stack are connected by a C-shaped clamp mounted in engagement with both components and further including means for forcing the components into engagement with the clamp.